UNITED STATES PATENT OFFICE 2,418,746

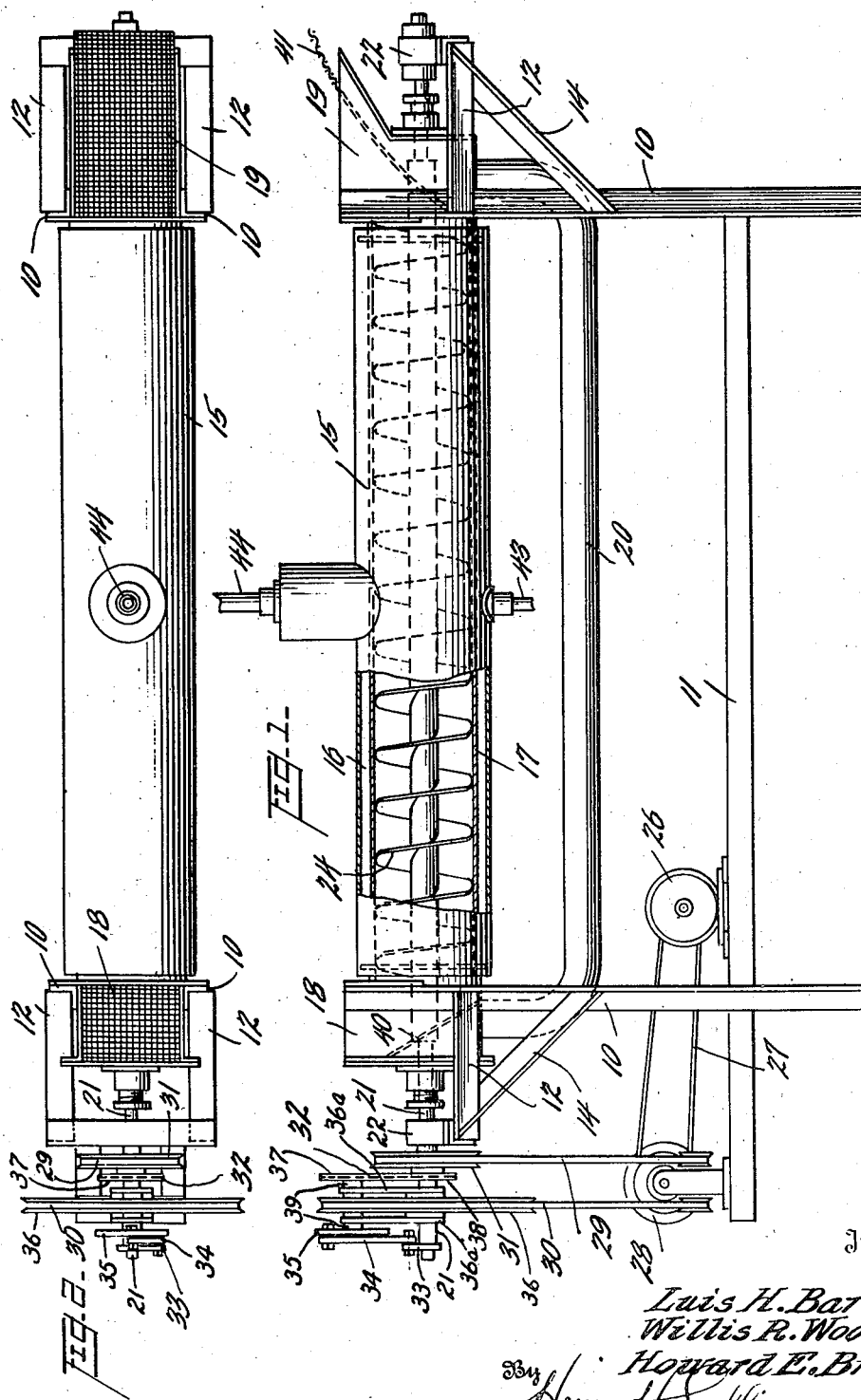

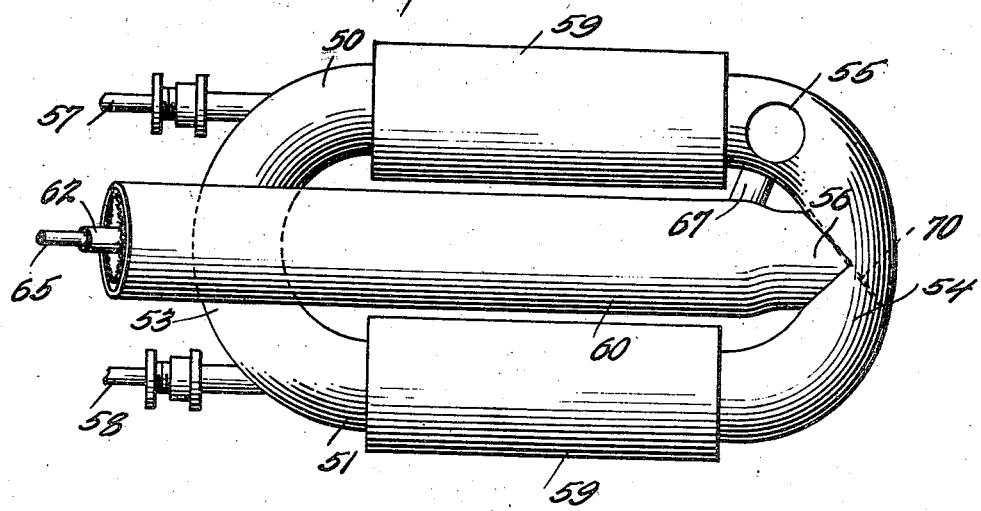
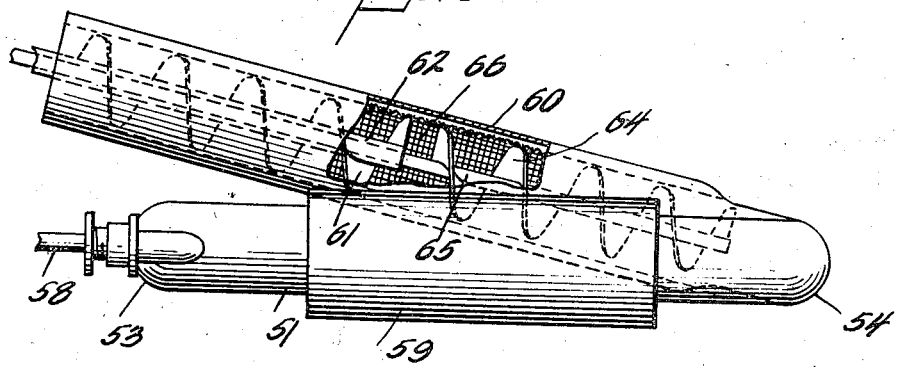

FOOD FREEZING MACHINE

Luis H. Bartlett, Willis R. Woolrich, and Howard E. Brown, Austin, Tex., assignors to Texas Research Corporation, Austin, Tex., a corporation of Texas Application September 27, 1941, Serial No. 412,648

25 Claims. (Cl. 62—114)

This invention relates to food freezing machines of the liquid immersion type and has for its principal object the provision of a mechanism best suited to the efficient utilization of the principle of removal of heat by a polyphase metastable medium, that is, one which is not thermodynamically stable under the prevailing temperature and other conditions of restraint.

A second object of the invention is to provide a highly efficient quick freezer capable of handling viscous media at a low power rate.

An important object of the invention is to provide a device of the character described in which the refrigerated surface is a seamless, jointless element of a heat transfer system using chilled brine or of a direct expansion flooded system, thus avoiding possible leakage of the refrigerant such as ammonia or a salt solution into the medium such as a syrup, usually containing highly dispersed fine ice crystals.

From a commercial standpoint important features of the present invention are the provision of a sturdy compact light weight quick freezer for continuous operation at the point most convenient to the locality of the food to be frozen and the provision of a low cost chilling device giving a high rate of heat transfer from the refrigerant to the heat transfer medium and hence operating with an unusually small quantity of the polyphase medium and a minimum area of insulated surface.

Other objects of the present invention relate primarily to details such as the use of a cylinder as the refrigerated surface in combination with a helical worm serving in the dual capacity of a scraping agitator to keep the cylinder free of adhering frozen particles and as a conveyor for moving the freezing food through the machine.

While almost any kind of foodstuff may be frozen in this machine it is not at present suited to the freezing of such leafy vegetables as lettuce or cabbage. Any object which can readily be drained of the adhering fluid is suitable, i. e., any material where there is a low ratio of external surface to displacement.

In previous systems the difficulties of circulating viscous fluids has led to the use of more dilute syrups than were indicated and this in time has led to freezing at temperatures above the present day storage temperature. When this occurs it is found that fruit which has been frozen at a temperature well above zero will complete its freezing in storage and the individual pieces will then freeze together solidly making it difficult to remove a portion of a 20 pound can, for example. The freezer of this invention causes constant relative motion between the conveyor and the food, between the individual pieces of food, and between the food and the heat transfer fluid. This prevents freezing together of the individual pieces of food and also prevents the food from freezing to the conveyor.

In the present system a fluid having a viscosity of 4000 centipoises can be handled altho a fluid with this viscosity is entirely unsuitable as a pump circulated heat transfer medium. We have in fact successfully handled fluids of 10,000 centipoises. With the present machine the sugar solution may vary from 60% to as high as 67% of sugar or sugars with a temperature of freezing which may be, but rarely is, as low as 18° below zero Fahrenheit. As an example, an invert sugar syrup of 62½% sugars has an initial freezing point of −4° F. and is used just a few degrees lower than that, probably from −5° F. to −7° F. It is seldom necessary to freeze the food at a lower temperature than two or four degrees below zero Fahrenheit.

We do not wish to be limited to any particular media but find the best results are obtained by using a metastable supercooled aqueous solution of sugars containing highly dispersed finely subdivided particles of ice plus optional particles of one or more of the sugars. It is frequently advisable to allow the heat transfer medium periodically to attain a temperature higher than the eutectic point, followed by rapid chilling to the metastable supercooled condition. Such a medium takes up the heat of the material to be frozen without appreciable rise in temperature of the liquid as the heat units are absorbed in the change of phase of the solvent particles.

In the drawings:

Figure 1 is a side elevation partly in section of a portable machine embodying our invention.

Figure 2 is a top plan view.

Figure 3 is a plan view of a larger machine.

Figure 4 is a side view of the device Figure 3.

Referring to Figure 1, the frame for this 50 pound capacity unit consists of four vertical angle irons 10 to which are secured horizontal angle irons 11 near the bottom and side brackets 12 at each end strengthened by struts 14. On this frame is supported a worm housing consisting of an outer cylinder 15 forming an annular space 16 with an inner cylinder 17 which preferably is seamless and is secured to and communicates with the entry hopper 18 on one end and the exit hopper 19 on the opposite end. The two hoppers are connected by a passageway 20 whereby liquid heat transfer medium may flow from the exit hopper 19 to the receiving hopper 18. In the size specified the floor space required is 16" by 8' and the liquid capacity is 18 gallons.

As shown in Figure 1, the shaft 21 extends through both hoppers and the driving shaft is journalled at each end of the frame in bearings 22 mounted on cross angle irons at the extreme ends of the brackets 12. The continuous flight 24 of the worm conveyor fits snugly the inside of the wall of the cylinder 17 which serves as the heat transfer surface of the device. This surface is kept clean at all times of the frozen particles of the conveying medium by reason of the constant cleaning by the close fitting peripheral edge of the flight 24.

Mounted on the longitudinal angle bars 11 of the frame near the left pair of uprights 10 is an electric motor 26 connected by a belt 27 to a speed change device 28 which drives the main shaft with an intermittent oscillating motion through the belts 29 and 30, the former driving the wheel 31 journalled upon the main shaft and connected through the chain 32 with a modified epicycloidal drive and the latter driving the large central pulley wheel 36 also journalled on shaft 21. At the end of shaft 21, and fast to it, is the small crank 33 receiving power thru the link or connecting rod 34 driven by wheel 35, fast to axle 39 journalled in and therefore turning with the large pulley wheel 36 which constantly revolves. On the other end of this axle 39 is the driven sprocket wheel 37 joined by chain 32 with the driving sprocket wheel 38 which is fast to the smaller pulley wheel 31 constantly driven by the belt 29 and turning freely on shaft 21. The wheels 36 and 31 rotate about the shaft 21 but are not fastened to it. The two arms 36a, fast at each side to the hub of wheel 36 are optional but are advantageous as they provide a wide bearing for the axle 39 which turns freely in the arms as also it does in the rather narrow bearing in the wheel 36 itself. If the larger pulley wheel 36 were kept from turning, shaft 21 would merely oscillate back and forth equally without making a revolution; if the wheel 35 were locked to pulley 36 and the belt 29 omitted, the shaft 21 would merely rotate without oscillation; but, as shown, shaft 21 moves intermittently forward with alternate but smaller reverse motions of the shaft, so that net movement is step by step forward. The preferred arrangement is such that the shaft will be advanced approximately a fifth of a turn in the forward direction followed by roughly a sixth of a turn in the backward direction, thus giving a slow forward speed which not only gives the mild agitation which is required but it also serves to give the effective forward motion while retaining the foodstuff within the machine for a sufficient time to give what is known in the trade as complete freezing. We find it sufficient to employ an ordinary screen as at 40 in the receiving hopper and a less sloping and preferably longer screen 41 at the exit hopper to keep the material being frozen in the desired path without interfering with the return flow of the heat transfer medium.

The annular space 16 is filled with a refrigerating material which may be brine but is preferably a volatile refrigerant operating on the flooded system, the liquid entering through the nipple 43 expanding within the chamber 16 while the gas is discharged through the pipe 44. The rate of expansion is controlled in the usual manner so as to give the desired temperature most suitable for the particular material being frozen.

Since the refrigerated surface 17 is a single cylinder free from seams and joints there is no danger of the refrigerant leaking into the system through the worm housing.

The preferred form it will be noted is highly suitable for ready transportation. Since the machine is light and compact weighing but 700 pounds, it is easily moved in a truck as small as one of a half-ton capacity which enables the freezer to follow the harvest from field to field or from orchard to orchard. Exclusive of power for refrigeration the power required for the unit described is less than ¼ H. P. The coefficient of heat transfer from the refrigerant to the polyphase medium is quite high, about 200 B. t. u. per square foot per hour per degree, due to the action of the rotating helicoid which sweeps away the fluid film at each revolution of shaft 21.

In operation the fruit is cut to the size required for serving, and is then poured into the receiving hopper 18, falling into the chilled medium which preferably does not entirely fill the worm chamber. Obviously berries, other foodstuffs, or other materials are similarly handled. The liquid or slurry may be any of the heat transfer mediums normally used for such purposes but our preference is to employ an invert sugar solution having a viscosity not much greater than 2000 centipoises at the preferred operating temperature of one or two degrees below zero. We do not wish to be limited, however, to any particular heat transfer medium within the worm chamber or refrigerant within the annular chamber surrounding it. The food floats in the heat transfer medium preferably of polyphase type and floats partially submerged. The intermittent movement of the screw conveyor carries the food with the heat transfer medium which, since it does not completely fill the refrigerated surface 17, is not unduly confined and hence will not deform or crush the food to be frozen as the worm conveyor moves alternately forward and rearward. Since practically all of the commercial speed change devices such as 28 can readily be altered in their speed change ratio while running, the speed of the conveyor can be altered while the device is in operation and should be such as to allow complete freezing of the various sized articles during their travel through the seamless tube 17.

The number of minutes required will actually vary within quite wide limits, depending upon the food being frozen and varying from as little as three minutes for green peas up to as much as 45 minutes for large products, the usual time of travel varying from 5 to 17 minutes, the latter for example, taking care of whole figs, which may be as large as 1¾ inches. Other typical times for freezing are 5 to 9 minutes for pears, peaches, or apples cut in eighths when up to 2½" in size and a minute or so longer for 3" apples; disjointed chicken 5 to 11 minutes; bananas 10 to 12 minutes; segmented grapefruit 5 to 8 minutes; ¾" slices of pork, 6 minutes.

It will be noted that when the food particles are part way through the tube they will have been frozen to such an extent as to have acquired considerable mechanical strength and hence these pieces of frozen food may be discharged as individually frozen pieces against the exit screen 41, which is periodically raked, by hand or otherwise, to remove the frozen product which latter is drained and then packaged. The draining need not be too complete as the protecting film of frozen heat transfer medium coating the food substantially eliminates deterioration of the food due to the action of atmospheric oxygen during storing. The medium may be operated in the metastable state and the coating stabilized after chilling is completed or it may be operated in the stable state and later cooled until partial or total solidification of the coating occurs.

In the modified form of Figures 3 and 4 there are two parallel horizontal tubes 50 and 51 joined at each end by a semi-circular tube 53 or 54, the latter having therein a feeding port 55 and also an exit port 56. The conveyor worms in each of the pipes 50 and 51 are driven by the shafts 57 and 58, preferably at the same speed and each tube is surrounded by a refrigerant jacket 59 as in the smaller capacity device shown in Figures 1 and 2.

Rising from the exit port 56 is a discharge tube 60 having therein a relatively slow drainer helicoid 61 on a sleeve 62 and a somewhat faster discharge helicoid 64 on a shaft 65 turning within the sleeve 62. A perforated drainer tube 66 fits more or less snugly the two flights and is surrounded in turn by the solid tube 60. This permits the draining of the heat transfer fluid which is carried from the tube 60 to the main body through the short passage 67 forming the fluid return from the drainer. In this larger quick freezing machine the fruit, fish, meat or other product is fed into the constantly flowing medium through the feeding port 55 and travels from right to left in the passageway 50 of Figure 3, being conveyed by a flight conveyor exactly as in the preferred form. The freezing material passes through the bend 53 to the straight tubular portion 51 which has a horizontal helicoid, which advances the material toward bend 54 while the helicoid in the tube 50 advances the material in the opposite direction. The now frozen material strikes the deflecting grid 70 which directs it into the path of the discharge helicoid 64 which elevates the frozen food at a relatively slow speed discharging the frozen particles to the further drainer helicoid 61 which is operating at a still slower speed. The latter helicoid discharges the now drained food from its upper end as individually frozen pieces into a suitable receptacle not shown. As in the smaller device the fluid level in the horizontal passageway is preferably lower than the top of the tubes 50 and 51 to prevent any possible crushing of the material to be frozen.

What we claim is:

1. In a quick freezing machine of the type employing a heat transfer medium in contact with the articles to be frozen, a member having therein a passageway, means for chilling the surface of the passageway below the initial freezing point of the heat transfer medium, an agitator for freeing the wall of the passageway from adhering frozen particles and for moving the heat transfer medium and the refrigerated articles thru the passageway, and power means for imparting to the agitator an irregular motion, including a constant series of short forward movements alternating with periods of dwell, whereby the particles are advanced in a series of impulses.

2. The device of claim 1 in which the irregular motion includes cycles each consisting of a forward movement, a momentary dwell, a rearward movement of less extent than the forward movement and second momentary dwell.

3. The device of claim 1 in which the passageway is a cylindrical chamber, the agitator is a worm conveyor and the irregular motion oscillates the worm.

4. In a quick freezing machine of the type employing a heat transfer medium in contact with the articles to be frozen, a tubular surface, means for chilling said surface below 5° F., a worm agitator surrounded by said surface for scraping therefrom frozen particles as formed, and power means for driving the agitator with oscillating motion in uneven amounts whereby the agitator is given a net movement of a slow rotation in one direction in a step by step manner, whereby to more effectively scrape the frozen particles from the tubular surface while driving the medium and its contents in said one direction.

5. In combination, a device for conveying a polyphase heat transfer medium including an entrance end, an exit end, and a jacketed tubular confining portion between said ends, means for chilling said portion, means within the confining portion for scraping the walls thereof and for moving the medium therethru, and return means for conducting the medium from the exit end to the entrance end.

6. In combination, a conduit having an entrance portion to receive food to be frozen, an exit portion, and a cylindrical chamber portion, a refrigerating jacket surrounding said chamber portion, a helicoid conveyor in said chamber portion, driving mechanism for rotating the conveyor intermittently in forward and rearward directions with a constant differential in the forward direction to agitate and advance a fluid in the conduit from the entrance portion to the exit portion, means for guiding the frozen food from the exit portion of the conduit, and means for returning the fluid from the exit portion to the entrance portion.

7. In a quick freezing machine for freezing foodstuffs, an endless circuit for a polyphase heat transfer medium including a plurality of cylindrical tubes, means for joining the ends of the tubes to form said circuit, an inlet port and an outlet port in said circuit, means for chilling the medium below the initial freezing point of foodstuffs to be frozen, a conveyor in each tube for causing a flow thru the circuit and for freeing the tube of frozen particles, an inclined discharge duct leading from the exit port, means within the duct for withdrawing the frozen foodstuff from the circuit, said duct serving as means for returning to the circuit a portion of the liquid phase of the medium adhering to the frozen foodstuff as it leaves the circuit.

8. In a machine for quick freezing water-containing articles, a chamber, a jacket surrounding the chamber, a liquid chilling medium within the chamber to a level below the top thereof, refrigerating means within the jacket for refrigerating the liquid chilling medium below its initial freezing temperature and an agitator within the chamber in contact with an inner surface thereof and means for moving said agitator alternately forwardly and backwardly for splashing the liquid over the articles to be frozen and for removing the ice crystals as formed on the inner surface of said chamber and for causing the ice crystals to come into intimate contact with the articles to be frozen, whereby to facilitate transfer of heat units from the articles to the chilling medium.

9. In combination a fluid holding device, an inclined discharge tube leading therefrom, a strainer tube of smaller diameter than the discharge tube and spaced within the same with its lower end extending below the position of the normal liquid level of said device, and a rotatable helicoid conveyor within the strainer tube for withdrawing immersed articles from the device, whereby part of the adhering fluid on the articles will pass through the strainer tube to the discharge tube and by the latter be returned to the device.

10. The device of claim 9 in which a second rotatable helicoid conveyer within the strainer tube receives the articles removed by the first helicoid conveyor.

11. In combination, a surface forming a portion of a path for a continuously circulating freezing medium including water as the solvent and an edible freezing point depressant as the solute, means for chilling the surface below the initial freezing point of the medium, means for introducing food articles into the medium; means for removing the ice crystals formed on said surface, moving the medium and the food articles across said surface, and for removing the frozen food articles from the medium with ice crystals adhering thereto; and means for returning the medium from the point of exit of the food to the point of introduction.

12. The device of claim 11 in which the surface and the medium return means form an endless path through which the medium constantly circulates, and the means for chilling the surface reduces the temperature of the medium to from 5° above to 18° below zero Fahrenheit and at a rate so that ice crystals are always present in the medium in proximity to the articles.

13. In a device for quick freezing food articles in a heat transfer medium composed of a solvent and a solute, means for causing the medium to move in an endless path, a refrigerating surface forming a portion of said endless path, means for removing from said refrigerating surface the solid phase of the solvent as formed and dispersing it in the heat transfer medium to form a slurry, means for introducing food products to be frozen into the medium and in contact with said solid phase and means for removing the frozen product from the medium with a coating of the medium thereon.

14. The device of claim 13 in which the surface is the inner face of a tube chilled below 5° F.

15. The device of claim 13 in which the refrigerating surface is the inner face of a seamless tube, the medium is a sugar in water solution, initially freezing below 5° F., and the ice removing means is a worm.

16. The process of freezing food products characterized by circulating a viscous heat transfer medium in an endless path including passage in contact with a refrigerated surface to form ice crystals, scraping said crystals from said surface thus converting a portion of the heat transfer medium to slush, and immersing the product to be frozen in the heat transfer medium throughout a portion of its circulating path.

17. The process of freezing food products characterized by the steps of circulating a slush-containing heat transfer medium in an endless path including passage in contact with a refrigerated surface chilled below the initial freezing point of the heat transfer medium and thus increasing the amount of slush by conversion of a portion of the liquid phase of the heat transfer medium to the solid phase, scraping the crystals of the solid phase from said surface, and immersing the product to be frozen in the heat transfer medium through a portion of its circulating path.

18. The process of freezing food products which consists in mixing unfrozen products with a liquid heat transfer medium containing slush, passing the heat transfer medium and the products in contact with a refrigerated surface to form ice crystals within the body of the heat transfer medium, scraping the ice crystals from said surface, removing the products from the heat transfer medium, and returning the heat transfer medium to the place of mixing with the product, thus to form an endless path for the heat transfer medium.

19. The process of claim 18 in which the returning heat transfer medium is in contact with a confining surface exteriorly exposed to room temperature.

20. The process of freezing food articles which consists in moving the articles, while immersed in a slushy heat transfer medium, in contact with a refrigerated surface until ice crystals are formed, removing the ice crystals from the surface and dispersing them throughout the heat transfer medium and in contact with the food articles being frozen, and finally removing the frozen articles from the slushy heat transfer medium.

21. The process of claim 20 in which the heat transfer medium contains sugar in solution to the extent that the heat transfer medium is viscous thus insuring high dispersion of the ice particles by restricting the rising to the surface of the ice particles.

22. In combination, a container forming an endless passage for a slushy multiphase heat transfer medium including a solvent, means for rapidly chilling the heat transfer medium during a portion of its travel to form fine particles of the solvent, means for scraping the so-formed particles from the wall of the container, for moving the articles immersed in the heat transfer medium through a portion of the endless path, and for tumbling the articles and the particles to afford dispersion of the particles and the articles, and means for removing the frozen articles from the path of the heat transfer medium and for draining a portion of the adhering heat transfer medium back to the container.

23. The process of quick freezing food articles which consists in forcing a slushy sugary heat transfer medium to move in a horizontal endless path, passing the heat transfer medium through a cylindrical surface for a portion of its path while permitting free passage of air above the slushy heat transfer medium, chilling said surface to produce crystalline particles from the liquid portion of the heat transfer medium, scraping the surface constantly to remove the fine particles as formed and to disperse the particles within the heat transfer medium, immersing the articles to be frozen in the heat transfer medium removing the articles when frozen, and changing the temperature of the heat transfer medium as it is moved from the point of exit of the frozen articles to the point of entry of the articles to be frozen.

24. The process of claim 23 in which the heat transfer medium is an aqueous solution, the particles are ice needles, the chilling temperature is below 5° F., the heat transfer rate is at least 200 B. t. u. per hour per square foot, and the heat transfer medium is viscous, whereby to lessen the tendency of the ice needles to rise to the surface of the heat transfer medium.

25. The process of rapidly chilling water-containing food products in a slush-containing heat transfer medium, which consists of passing the medium and such food products therein along the surface of an enclosing tube, chilling a portion of the surface below 5° F. thus forming further slush, and, simultaneously scraping the entire area of the chilled portion of the surface of the tube to remove the slush particles almost immediately upon formation.

LUIS H. BARTLETT.
WILLIS R. WOOLRICH.
HOWARD E. BROWN.

REFERENCES CITED

The following references are of record in the file of this patent:

UNITED STATES PATENTS

| Number | Name | Date |
|---|---|---|
| 2,116,738 | Zarotschenzoff | May 10, 1938 |
| 2,118,796 | Orrison | May 24, 1938 |
| 2,223,972 | Sterling | Dec. 3, 1940 |
| 2,202,498 | Leaf | May 28, 1940 |
| 1,912,651 | Nusbaum | June 6, 1933 |
| 2,211,153 | Noyes | Aug. 13, 1940 |
| 2,263,452 | Birdseye | Nov. 18, 1941 |
| 2,184,990 | Conn | Dec. 26, 1939 |
| 2,182,556 | Griswold | Dec. 5, 1939 |
| 2,332,367 | Birdseye | Oct. 19, 1943 |
| 2,164,362 | Taylor | July 4, 1939 |
| 2,259,841 | Spiegl | Oct. 21, 1941 |
| 1,129,716 | Ottesen | Feb. 23, 1915 |

FOREIGN PATENTS

| Number | Country | Date |
|---|---|---|
| 248,612 | Germany | May 23, 1911 |